United States Patent
Daley, III

(10) Patent No.: US 8,605,416 B2
(45) Date of Patent: *Dec. 10, 2013

(54) BAG COMPUTER TWO PART DISPLAY PANEL

(76) Inventor: Charles A. Daley, III, Rawai (TH)

(*) Notice: Subject to any disclaimer, the term of this patent is extended or adjusted under 35 U.S.C. 154(b) by 52 days.

This patent is subject to a terminal disclaimer.

(21) Appl. No.: 13/137,798

(22) Filed: Sep. 14, 2011

(65) Prior Publication Data

US 2012/0008261 A1  Jan. 12, 2012

Related U.S. Application Data

(63) Continuation of application No. 12/387,594, filed on May 6, 2009, now abandoned, which is a continuation-in-part of application No. 11/796,920, filed on May 1, 2007, now abandoned.

(51) Int. Cl.
*G06F 1/16* (2006.01)

(52) U.S. Cl.
USPC ................................... 361/679.03

(58) Field of Classification Search
None
See application file for complete search history.

(56) References Cited

U.S. PATENT DOCUMENTS

| | | | | |
|---|---|---|---|---|
| 5,217,119 A * | 6/1993 | Hollingsworth | ............ | 206/583 |
| 5,222,642 A * | 6/1993 | Solarz | ............ | 224/191 |
| 5,445,266 A * | 8/1995 | Prete et al. | ............ | 206/320 |
| 5,494,157 A * | 2/1996 | Golenz et al. | ............ | 206/320 |
| 5,678,666 A * | 10/1997 | Shyr et al. | ............ | 190/102 |
| 5,774,338 A * | 6/1998 | Wessling, III | ............ | 361/730 |
| 5,887,723 A * | 3/1999 | Myles et al. | ............ | 206/760 |
| 5,887,777 A * | 3/1999 | Myles et al. | ............ | 224/578 |
| 5,908,147 A * | 6/1999 | Chuang | ............ | 224/607 |
| 6,105,764 A * | 8/2000 | Scicluna et al. | ............ | 206/320 |
| 6,161,738 A * | 12/2000 | Norris | ............ | 224/153 |
| 6,167,413 A * | 12/2000 | Daley, III | ............ | 708/139 |
| 6,283,299 B1 * | 9/2001 | Lee | ............ | 206/760 |
| 6,393,745 B1 * | 5/2002 | Miki | ............ | 40/586 |
| 6,597,568 B2 * | 7/2003 | Ryder | ............ | 361/679.55 |
| 6,685,016 B2 * | 2/2004 | Swaim et al. | ............ | 206/320 |
| 6,763,942 B1 * | 7/2004 | Yeh | ............ | 206/320 |
| 6,769,588 B2 * | 8/2004 | Zheng | ............ | 224/576 |
| 6,956,614 B1 * | 10/2005 | Quintana et al. | ............ | 348/373 |
| 6,962,277 B2 * | 11/2005 | Quintana et al. | ............ | 224/262 |
| 7,265,970 B2 * | 9/2007 | Jordan | ............ | 361/679.27 |
| 7,821,779 B2 * | 10/2010 | Daley, III | ............ | 361/679.02 |
| 7,876,558 B2 * | 1/2011 | Daley, III | ............ | 361/679.55 |
| 7,881,048 B2 * | 2/2011 | Daley, III | ............ | 361/679.03 |
| 7,889,496 B2 * | 2/2011 | Daley, III | ............ | 361/679.55 |
| 7,894,179 B2 * | 2/2011 | Daley, III | ............ | 361/679.03 |

(Continued)

FOREIGN PATENT DOCUMENTS

JP 2004097801 A * 4/2004 ............ A45C 11/00

*Primary Examiner* — Lisa Lea Edmonds

(57) ABSTRACT

Disclosed is an improvement to the bag computer of application Ser. No. 11/796,920. The bag computer has a pivoting display panel near its top front which can store against the bag front or pivot into the line of sight of the bag computer wearer/operator. The display panel may have controls on the side opposite the display. To gain advantage through multiple components, the display panel may be divided into a front portion with display and back portion with controls. Ways to divide and assemble these display panel components are described and include: 1) direct attachment between the two portions with one portion connecting to the bag; 2) a fastening frame attaching the two portions with one portion connecting to the bag; 3) an attachment frame which connects to the bag and accepts the two portions.

33 Claims, 6 Drawing Sheets

(56) References Cited

U.S. PATENT DOCUMENTS

| | | | |
|---|---|---|---|
| 7,974,081 B2* | 7/2011 | Daley, III | 361/679.03 |
| 7,978,464 B2* | 7/2011 | Daley, III | 361/679.02 |
| 8,014,138 B2* | 9/2011 | Daley, III | 361/679.03 |
| 8,094,440 B2* | 1/2012 | Daley, III | 361/679.03 |
| 8,125,770 B2* | 2/2012 | Daley, III | 361/679.03 |
| 8,194,398 B2* | 6/2012 | Daley, III | 361/679.03 |
| 2004/0134813 A1* | 7/2004 | Domotor | 206/320 |
| 2005/0000843 A1* | 1/2005 | Zheng | 206/457 |
| 2005/0011920 A1* | 1/2005 | Feng | 224/275 |
| 2005/0045673 A1* | 3/2005 | Godshaw et al. | 224/153 |
| 2005/0103815 A1* | 5/2005 | Lee et al. | 224/275 |
| 2006/0042996 A1* | 3/2006 | Picot et al. | 206/586 |
| 2006/0113203 A1* | 6/2006 | Daley | 206/320 |
| 2006/0113213 A1* | 6/2006 | Daley, III | 206/576 |
| 2006/0144663 A1* | 7/2006 | Gullen et al. | 190/110 |
| 2006/0163303 A1* | 7/2006 | Trutanich | 224/576 |
| 2007/0151881 A1* | 7/2007 | Zheng | 206/320 |
| 2007/0199844 A1* | 8/2007 | Daley, III | 206/320 |
| 2007/0199851 A1* | 8/2007 | Yau | 206/472 |
| 2007/0201201 A1* | 8/2007 | Daley, III | 361/683 |
| 2008/0161753 A1* | 7/2008 | Gillespie et al. | 604/65 |
| 2008/0192421 A1* | 8/2008 | Daley | 361/681 |
| 2008/0237250 A1* | 10/2008 | Swansey | 220/756 |
| 2008/0273298 A1* | 11/2008 | Daley | 361/683 |
| 2008/0289886 A1* | 11/2008 | Burkitt | 178/18.03 |
| 2009/0009476 A1* | 1/2009 | Daley, III | 345/168 |
| 2009/0009938 A1* | 1/2009 | Daley, III | 361/680 |
| 2009/0027632 A1* | 1/2009 | Choi | 353/98 |
| 2009/0046416 A1* | 2/2009 | Daley, III | 361/679.55 |
| 2009/0107877 A1* | 4/2009 | Daley, III | 206/576 |
| 2009/0107878 A1* | 4/2009 | Daley, III | 206/576 |
| 2009/0141446 A1* | 6/2009 | Daley, III | 361/679.55 |
| 2009/0185342 A1* | 7/2009 | Daley, III | 361/679.27 |
| 2009/0190296 A1* | 7/2009 | Daley, III | 361/679.27 |
| 2009/0201637 A1* | 8/2009 | Daley, III | 361/679.29 |
| 2009/0225508 A1* | 9/2009 | Daley, III | 361/679.27 |
| 2009/0225509 A1* | 9/2009 | Daley, III | 361/679.29 |
| 2009/0236247 A1* | 9/2009 | Daley, III | 206/320 |
| 2009/0284908 A1* | 11/2009 | Daley, III | 361/679.17 |
| 2010/0050485 A1* | 3/2010 | Forte et al. | 40/1.5 |
| 2010/0193384 A1* | 8/2010 | Daley, III | 206/320 |
| 2010/0219221 A1* | 9/2010 | Zheng | 224/576 |
| 2010/0220434 A1* | 9/2010 | Daley, III | 361/679.27 |
| 2010/0256561 A1* | 10/2010 | Gillespie et al. | 604/151 |
| 2011/0032669 A1* | 2/2011 | Daley, III | 361/679.03 |
| 2011/0051349 A1* | 3/2011 | Daley, III | 361/679.27 |
| 2011/0051362 A1* | 3/2011 | Daley, III | 361/679.55 |
| 2011/0102992 A1* | 5/2011 | Daley, III | 361/679.03 |
| 2011/0164366 A1* | 7/2011 | Daley, III | 361/679.03 |
| 2011/0267754 A1* | 11/2011 | Daley, III | 361/679.03 |
| 2011/0304965 A1* | 12/2011 | Daley, III | 361/679.03 |
| 2011/0304970 A1* | 12/2011 | Daley, III | 361/679.26 |
| 2012/0008261 A1* | 1/2012 | Daley, III | 361/679.01 |
| 2012/0106055 A1* | 5/2012 | Daley, III | 361/679.03 |
| 2012/0275102 A1* | 11/2012 | Daley, III | 361/679.03 |

\* cited by examiner

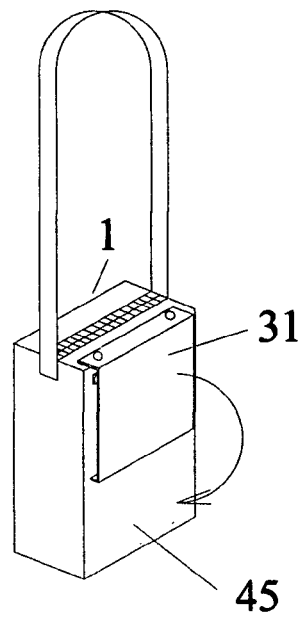
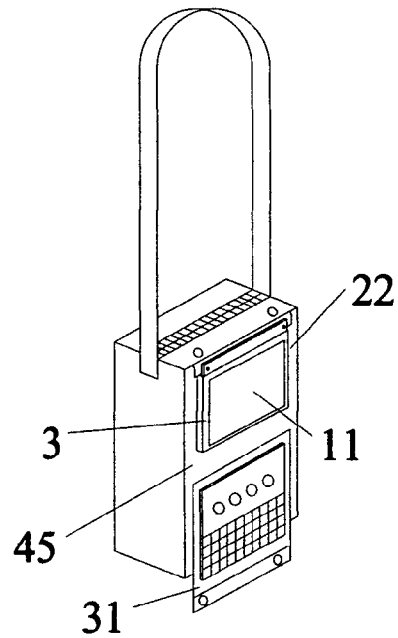
FIG. 1
FIG. 2
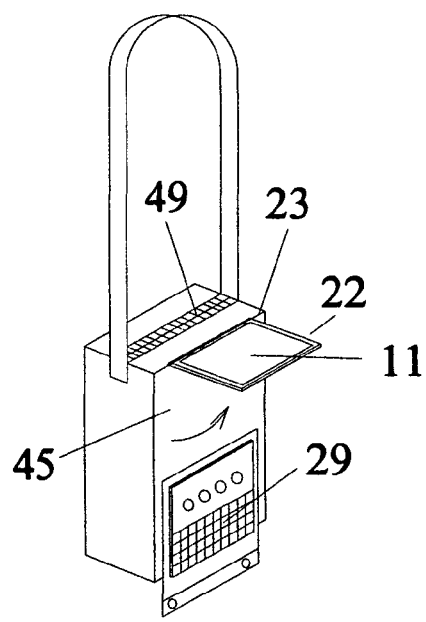
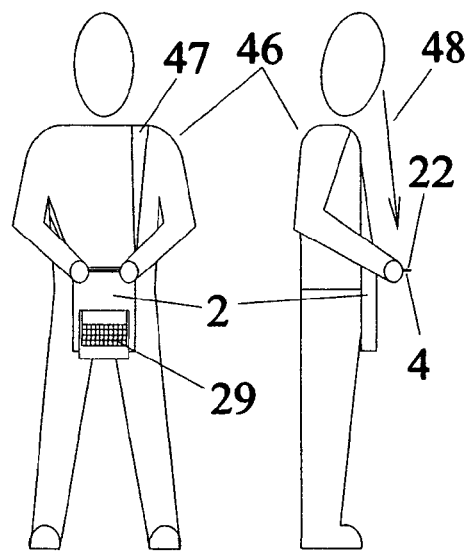
FIG. 4A
FIG. 3
FIG. 4B

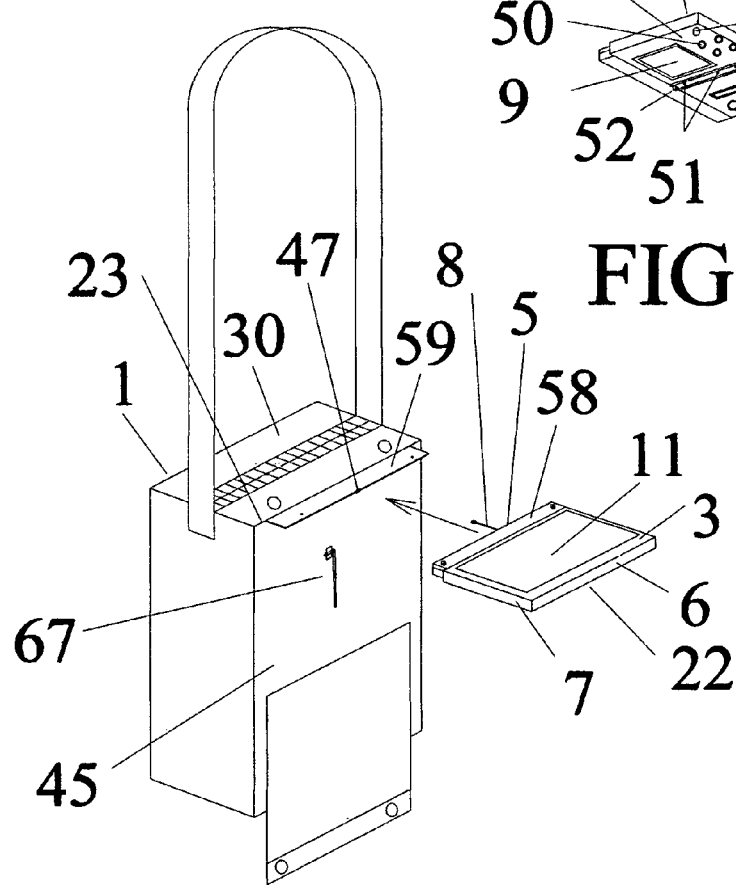

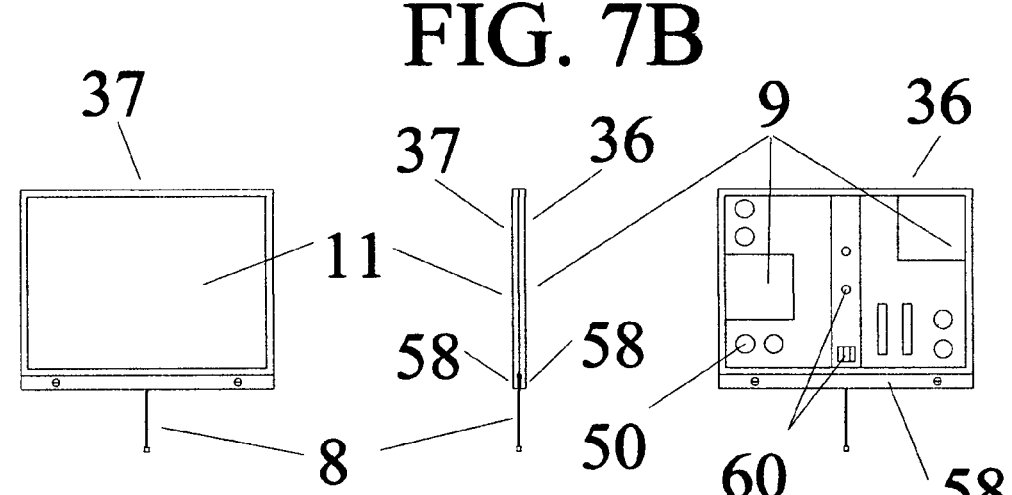
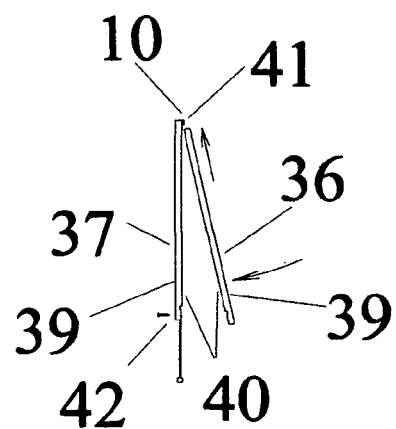

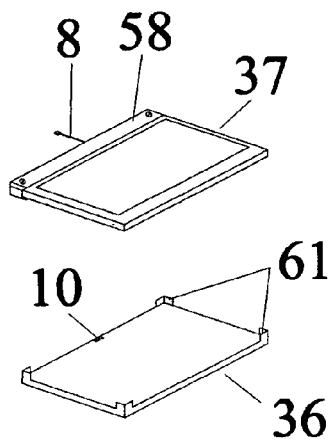
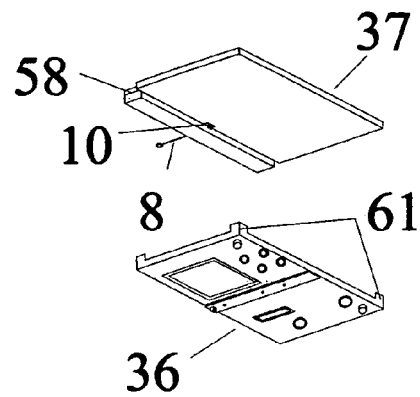
FIG 8A         FIG 8B
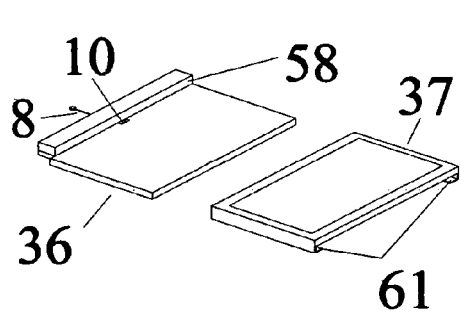
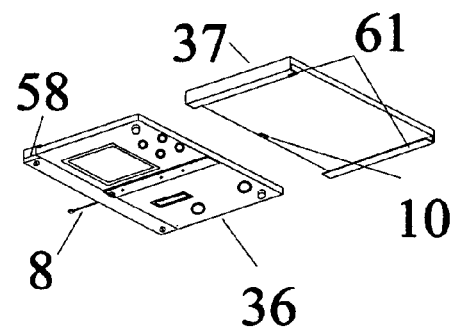
FIG 9A         FIG 9B

BAG COMPUTER TWO PART DISPLAY PANEL

CROSS-REFERENCE TO RELATED APPLICATIONS

This application is a Continuation application of U.S. patent application Ser. No. 12/387,594, filed on May 6, 2009 now abandoned, which is a Continuation-In-Part of U.S. application Ser. No. 11/796,920, filed May 1, 2007 now abandoned. The disclosures of all of these U.S. patent applications are incorporated herein by reference.

TECHNICAL FIELD

The present invention relates to a computer designed for mobile use.

BACKGROUND OF THE INVENTION

Bag computers are composed of a bag and computer joined so that the display panel pivots around the top front end of the bag so it can lay approximately flat against the bag front when stored or pivot with its display facing outward into the line of sight of the operator when in use. There may be a keyboard lower down on the bag front and there may be manual controls on the back of the display panel.

The bag computer was described in application Ser. No. 11/796,920. This application is a continuation on those inventions.

One characteristic of the most popular computers is division into components. This allows the computer owner to buy or replaces less expensive individual components when needed. Choice can be made between various prices and makers so the owner can optimize the result of his array of options. Manufacturers, as well, may benefit from being able to concentrate of the production of one type of component. This invention aims to build on the bag computer concept by encouraging owner replaceable components for bag computers.

BRIEF DESCRIPTION OF THE INVENTION

A bag computer is a bag with a display panel pivotally attached to so that the display panel can pivot from a storage position approximately flat against the bag's front wall to an operating position away from the bag so that the display is in the line of sight of the operator/wearer and he can view the display. The display panel may be attached near the junction of the top and front walls so that the display is as near as possible to the operator/wearer and have the greatest apparent display size. There may be a cover and this may have a manual input device, such as a keyboard, on the inside surface so that the input devices is hidden when the cover is closed and covers the display but available for use when the cover flap is opened. The cover may pivot near the center of the bag's front and close by pivoting up and attaching to attachments near the top of the bag. On the back side of the display panel opposite the display, in other words facing downward as the operators views the display, there may be controls, such as a touch pad, that may be operated with the fingers while holding the display panel. The bag computer's computing unit may be in the display panel or may be mounted separately to the inside or outside of the bag. The majority of the bag interior is available for everyday cargo or peripherals which are accessible though an opening in the bag's top wall.

The display panel may be removable from the bag. This may be done using a pivoting computer equipment mount (PCEM) which is comprised of a bag part and a display panel part which have complimentary attachments. One or both of these parts may include the hinge means or be part of the hinge means which allows the display to pivot on the bag.

The PCEMs hinge means may be able to hold any angular position relative to the bag front. Instead, the display panel position may be maintained with a display panel prop which removably spans between the bag front and display panel back.

In addition to the display, the display panel may have controls, display panel prop holders or finger guides. There may be a camera or communication antenna on the distal edge of the display panel (opposite the PCEM).

To further divide the bag computer into components, the display panel may be divided into a front side display panel portion with display and back side display panel portion with controls along a plane parallel to the display panel front and back sides.

The two display panel portions may be attached to each other directly with the display panel part of the PCEM fixed to one or the other display panel portion. Alternatively, the edge area of the two display panel portions may work in combination to form the display panel part of the PCEM.

There may be a fastening frame to hold the two display panel portions together and the display panel part of the PCEM is located on either the front side or back side display panel portion. Alternatively, there may be an attachment frame which holds the two display panel portions together and also includes on the attachment frame the display panel part of the PCEM to connect the three parts to the bag. Either type or frame may include display prop fixtures, bumpers to contact the bag front or finger guides for the back side controls or prop fixtures.

BRIEF DESCRIPTION OF THE SEVERAL VIEWS OF THE DRAWINGS

FIG. 1 The bag computer is seen here in storage position with its display panel parallel to and adjacent to the bag's front wall and the cover over the display panel.

FIG. 2 Here the bag computer has its display panel in the same position as in FIG. 1 but the cover is open.

FIG. 3 Here the bag computer is in operating position with its diaply pivoted out into the line of sight of the wearer/operator.

FIG. 4A This is a front view of a manikin wearing and operating the bag computer. His hands are manipulating the controls on the back side of the display panel.

FIG. 4B This is a side view of a manikin wearing and operating the bag computer. His hands are manipulating the controls on the back side of the display panel.

FIG. 5 This is a detail of the parts of a bag computer including how the display panel is removable from the bag. The display is on the front side facing up.

FIG. 6A This is a figure of the display panel is tipped to show its back side including controls, tactile finger guides, bumpers, display prop holders and other details.

FIG. 6B This is a template or finger guide frame which fits the display panel and adds tactile finger guides, bumpers, display prop holders and other details.

FIG. 7A This is a front side view of the display panel showing details.

FIG. 7B This is a side edge view of the display panel showing details.

FIG. 7C This is a back side view of the display panel showing details.

FIG. 7D This is a side edge view of the display panel showing how it may be divided into a front side panel portion and a back side panel portion. In this embodiment the two parts are levered together with attachments.

FIG. 8A This view of the display panel shows an embodiment where the front and back side panel portions are attached using attachments found on one panel portion and matching the other portion. The mounting attachments to match the bag are found on the front side display panel portion.

FIG. 8B This shows the same parts as FIG. 8A but viewed from below so the display panel back side can be seen.

FIG. 9A This view of the display panel shows an embodiment where the front and back side panel portions are attached using attachments found on one panel portion and matching the other portion. The mounting attachments to match the bag are found on the back side display panel portion.

FIG. 9B This shows the same parts as FIG. 9A but viewed from below so the display panel back side can be seen.

DETAILED DESCRIPTION OF THE INVENTION

Figure 10A:
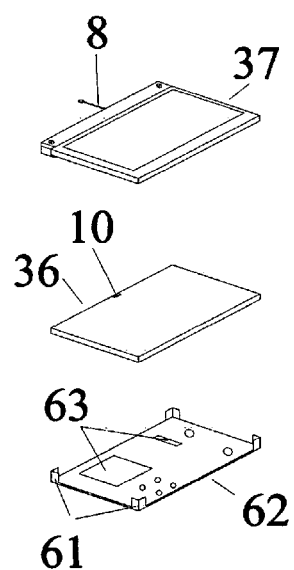
FIG. 10A In this view the front and back side panel portions are attached using a separate fastening frame which, in this case, includes openings, tactile finger guides, bumpers, display prop holders and other details.

A bag computer is a bag with a display panel, including input/output devices such as a display and graphic user input device, pivotally attached to the exterior of the bag so it may pivot horizontally from a storage position parallel to and adjacent the bag's front wall to an operating position away from the bag's front wall where the wearer/operator may view it. The bag computer's computing unit may be found in the display panel or elsewhere mounted to the bag's interior or exterior and is electrically connected to the display panel. A manual character input device such as a keyboard or electronic write pad may also be pivotally attached to the bag front. The bag computer may be seen as a system of components to facility the mobile use of a computer.

FIGS. 1, 2 and 3 show how a bag computer is deployed and used. As shown in FIG. 1 the display panel, when pivotally attached to the bag 1, is stored against the bag front 45 and may be covered with a cover, such as a cover flap 31 or rigid shaped cover. Shown in FIG. 2, when the cover 31 is repositioned, the display panel 22 is exposed for use. Here it can be seen that the display panel is in storage position with its front side 3, including display 11, and back side approximately parallel to the bag front wall exterior 45 and its back side adjacent to the exterior of the bag front wall. In FIG. 3, the display panel 22 is pivoted approximately around the junction of the front and top bag walls 23 to an operating position away from the bag front wall 45 with its display 11 properly oriented and in the line of sight of the operator/bag wearer so the display can be viewed and used. The back side of the display panel may have controls such as one or more touch pads, switched, or buttons, for operating the computer with fingers while holding and viewing the display on the display panel. The bag may have an opening 49 in its top wall to access the bag interior where peripherals or miscellaneous cargo may be stored. A keyboard 29 can be seen on the inside surface of the cover.

FIG. 4A, frontal view, and FIG. 4B, profile view, show the bag computer being worn by a manikin 46. The bag shoulder strap 47 holds the bag computer 2 to the operator so the computer will not fall and he can use two hands for operating the display panel 22 back side 4 controls or operate the manual character input device, in this case a keyboard 29. The display is in the line of sight 48 of the bag computer wearer.

The display panel may be removable from the bag. In this case, the bag and display panel may be pivotally joined with complimentary mounting attachments on the bag and display panel, also collectively known as "pivoting computer equipment mounts" (PCEM). As shown in FIG. 5, one or more bag part PCEMs, also known as bag mounting attachments 59, are found on the bag 1 and one or more complimentary display panel part PCEMs, also known as display panel mounting attachments 58, are found on the display panel. The hinge means which allows pivoting may be part of the bag mounting attachment or part of the display panel mounting attachment or part of both. The PCEM leaves the back side of the display panel unobstructed so controls located there can be used The bag mounting attachments may be located at or near the junction 23 of the bag's front wall 45 and top wall 30 and the display panel mounting attachments may be located at or near the attachment edge 5 of the display panel.

The actual character of the PCEM may vary although all combinations serve to pivotally attach the display panel to the bag so that the display panel may rest in storage position with its front and back sides approximately parallel to and adjacent to the bag front wall or may be pivoted to an operating position in the line of sight of the operator/wearer for operation.

The PCEM hinge means may be capable of holding the angular position between the display panel and bag front wall with, for example, a ratchet or friction hinge. Instead, as in the case where the PCEM hinge means is a flexible fabric flap, the angular position between the display panel and bag front wall may be maintained using a display panel prop assembly 67 designed to extending between the bag front wall and display panel back side and temporarily support the display panel in one or more viewing positions.

Because the display panel and bag have different life times, the display panel and bag may be separated for replacement or upgrading. The display panel 22 is of panel-like shape having front side 3 with display 11, an opposite back side which may have controls, an attachment edge 5 closest to the bag, a distal edge 6 opposite the attachment edge and two side edges 7. On or near the attachment edge there may be one or more display panel mounting attachments 58 which are the display panel part of the PCEM and are complimentary to bag mounting attachments located on the bag and pivotally connect the bag and display panel.

The bag computer's computing equipment, such as the computing unit, batteries and communication equipment may be located in the display panel. Alternatively, some or all of the computer equipment may be located on the exterior or in the interior of the bag and connected electrically with the display panel by, for example, an electrical wire 8 and associated plug(s) designed to lead through an opening 47 in the bag associated with the front wall or bag mounting attachment. The electrical wire and plug may be attached to the display panel and be of specific length, size and shape to connect the display panel and computing unit while they are installed to the bag. The computing unit may be removably mounted to a bag mounting assembly fixed to the inside surface of the bag's front. Much of the remainder of the bag's interior may be left unoccupied so it may be used to hold miscellaneous cargo and/or peripherals.

FIG. 6A shows the back side 4 of the display panel 22 where controls may be found and be available for use when the operator holds and uses the display panel while it is attached to the bag. These controls may include one or more touch pads 9, clickers, buttons 50, slides or other means to communicate with the computing unit with the hands.

The back side of the display panel may have prop holder, such as holes, sockets 51, clips 52, sliding fixtures, guides, runway, pins, or hinge means with mount to match and be complimentary to a display panel's prop bar which extends between the display panel and bag front and is used to support the display panel at one or more angles relative to the bag front wall.

There may be several display panel back side prop holders properly spaced and angled to prop up the display panel in the most commonly used positions. Different types of holders may be used to accommodate holding the display panel at various horizontal angles versus holding the display panel vertical and parallel to the bag front and prop bar. There may be molded-in prop position guides 53 to help the fingers engage the bar end into the right prop position on the back of the display with the hands without looking. The display panel may have a means of spacing the display panel back from the bag front, such as display panel edges extended toward the bag front beyond the plane of the display panel back side, legs, bumpers 54 or display panel mounting attachment extending toward the bag front from the display panel back side or a recessed area in the display panel back side to matching the prop holders and prop bar, so that the display panel, when in storage position, may lay approximately flat against the bag without interference from the display panel prop assembly.

The display panel back side may include finger guides 55 around or near specific controls to assist in finding these controls without looking. The finger guides may be in the form of molded in ridges around or near controls. As shown in FIG. 6B, a removable finger guide template 56 or finger guide frame with tactile finger guide 55 features may be used to indicate control positions. The finger guide template or frame may be rigid and include clips to attach it to the display panel or may be thin and attach to the display panel with adhesive or attachments that are part of the display panel. Display panel prop holders 57 may be included in a finger guide template or finger guide frame 56 which may be removable from the display panel. The finger guide and display panel prop holder may be combined on the same finger guide template or frame.

Shown in FIGS. 7A, 7B, 7C and 7D, to further divide the bag computer system into components, the display panel may be divided into two display panel portions along a plane parallel to the display panel front side and back side. The two portions are the front side display panel portion 37 and back side display panel portion 36. Each display panel portion has an outward facing surface 39 and an inward facing surface 40 and four edges. The outward facing surface of the front side display panel portion includes the display 11 and the outward facing surface back side display panel portion includes controls, for example, a touch pad 9 or other pointing device, switches or buttons 50. When the two display panel portions are assembled when forming the display panel, their inward facing surfaces are adjacent. The display may include a touch screen. The outward facing surface of the back side display panel portion may be mostly touchpad with a finger guide overlaying it and defining programmable function areas. The outward facing surface back side display panel portion may include holders for a display panel prop 60. Either display panel portions may be replaced whenever desired. The front side display panel portion and back side display panel portion may be held together with an attachment means. The two display panel portions are electrically connected with the computing unit and this connection may be located anywhere on or near the attachment edge of the display panel. The connection may be a wire with plug 10 to match the computing unit.

In one embodiment the attachment means holding the two display panel portions together may be comprised of a first attachment pair 41 on one adjacent edge of the two display panel portions and used to lever the panels together while a second attachment pair 42 hold the opposite adjacent edges of the display panel portions together. Examples of the first attachment pair use to lever the display panel portions together may include a hook, plug, ledge or socket. Examples of the second attachment pair include a clamp with screw, clip or other attachment. The display panel mounting attachment may be attached to either of the display panel portions. Instead, the display panel mounting attachment 58 may be formed by a combination of adjacent edges of the two display panel portions, for example, where the adjacent edges of the panel portions act as two jaws 58 to clamp the bag mounting attachments between them and hold the display panel to the bag.

The two display panel portions may have an electrical connection 10 between them. The electrical connection may be combined with one of the attachment pairs. Alternatively, each display panel portion may have an independent electrical connection 8 connecting the display panel portion with a separate computing unit.

In a second embodiment the attachment means holding the two display panel portions may be comprised of attachments on one or both of the two display panel portions which hold the two display panel portions together. The attachments may be clips, channels to slide on matching panel edges or rails, pins, or other means to attach the two panel portions. As shown in FIG. 8A, a view of the two parts from an angle showing upper surfaces, and in FIG. 8B, a view of the two parts from an angle showing lower surfaces, attachment clips 61 may be included on the back side display panel portion 36 and these match the body shape of the front side display panel portion 37 to hold the two parts together. Although, in this case, the display panel mounting attachment are part of the front side display panel portion, the display panel mounting attachment 58 may be located on either of the two display panel portions. The two display panel portions may have an electrical connection 10 between them. Alternatively, each display panel portion may have an independent electrical connection 8 connecting the display panel portion with a separate computing unit.

Shown in FIGS. 9A and 9B, the display panel mounting attachment 58 is part of the back side display panel portion 36 and the front side display panel portion 37 is removable. Again, attachments 61, such as channels to slide on matching panel edges or rails or clips, may be used to physically connect the two panel portion and an electrical connection 10 may be used to electrically connect the two panel portions. There may be a separate electrical connection 8 to lead to the computing unit attached to the bag.

Figure 10B:
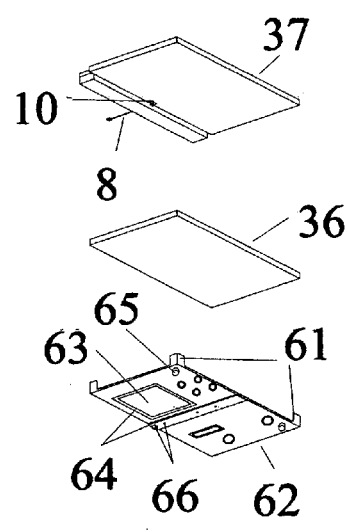
FIG. 10B This shows the same parts as FIG. 9A but viewed from below so the display panel back side can be seen.

In a variation on this embodiment, shown in FIGS. 10A and 10B, the attachment means holding the two display panel portions together may be comprised of a separate fastening frame 62 that includes attachments 61 which match and hold the back side display panel portion 36 and the front side display panel portion 37 together. The fastening frame may also include finger guides with guiding features such as openings 63, bumps, ridges 64 or other features in relief, to help the operator feel the position of controls on the display panel back side. The fastening frame may also include prop holders 66 or bumpers 65. The display panel mounting attachment may be located on fastening frame or either of the display panel portions. The two display panel portions may have an electrical connection 10 between them. Alternatively, each display panel portion may have an independent electrical connection 8 connecting the display panel portion with a separate computing unit.

Figure 11A:
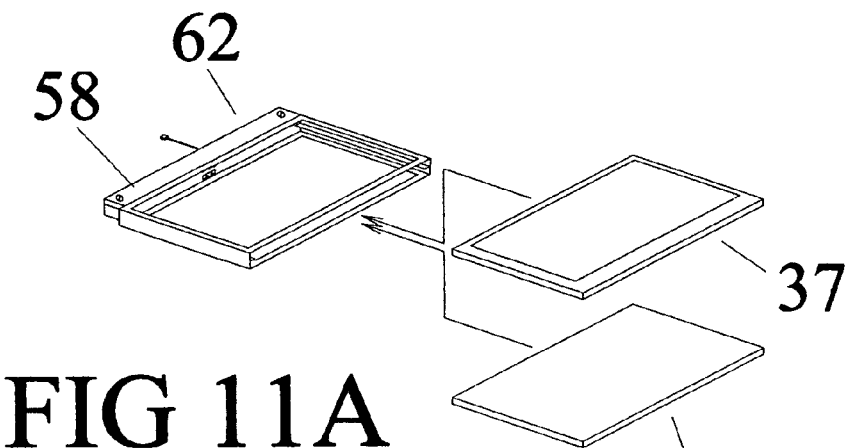
FIG. 11A In this embodiment an attachment frame has an attachment means to connect with the bag. The attachment frame accepts slide-in front and back side panel portions.
Figure 11B:
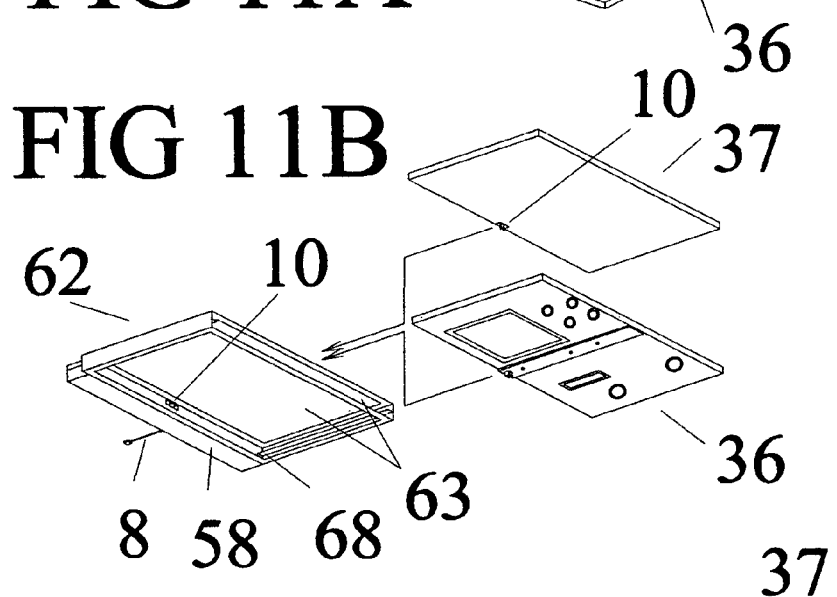
FIG. 11B This shows the same parts as FIG. 10A but viewed from below so the display panel back side can be seen.
Figure 12:
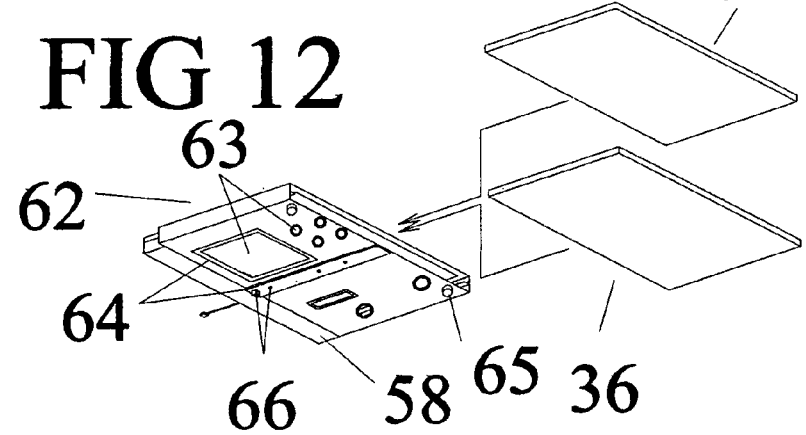
FIG. 12 In this case a attachment frame is also used to attach to the bag while accepting slide-in front and back side panel portions. Here, however, the openings, tactile finger guides, bumpers, display prop holders are included as part of the frame.

In a third embodiment, shown in FIGS. 11A, 11B and 12 the attachment means holding the two display panel portions together may be comprised of a separate attachment frame 62 designed to fit and hold the back side display panel portion 36 and the front side display panel portion 37 together and to the bag. The attachment frame has an attachment edge which has the display panel mounting attachment 58 which attaches the frame to the bag. The attachment frame has holding parts, such as receptacles, guides, rails 68 or gripping arms, to hold and retain the display panel portions in the attachment frame. The holding parts may match the shape of or complimentary attachments on the display panel portions.

The attachment frame may be box-like with one or more openings 63 to allow the display panel portions to be installed and to allow access to the display panel portions for operation after they are installed.

The display panel portions may slide into the receptacles of the attachment frame from one edge and in a direction parallel to the plane of the display panel front and back surface. Any edge of the attachment frame may be used for installation.

Electrical connection may be by plug between each display panel portion and the computing unit. Alternatively, there may be an electrical connection 10 between each of the display panel portions and the attachment frame. In this case, the attachment frame has a separate electrical connection 8 between the attachment frame and the external computing unit. In another alternative, the two panel portions may electrically connected directly with one of the display panel portions electrical connected to the attachment frame.

Finger guides, bumpers and prop holders may be included with the back side display panel portion. Alternatively, as shown in FIG. 12, the finger guides 64, bumpers 65 and prop holders 66 may be included as part of the attachment frame 62 with the back side display panel portion 36 being operated through finger guide openings 63 in the frame. The attachment frame may include the display panel mounting attachment 58. The attachment frame holds the front side display panel portion 37 and the front side display panel portion.

The invention claimed is:

1. A computer display device for mounting on a bag, the device comprised of:
   a) a display panel comprised of:
      i) an attachment edge;
      ii) a display panel mounting attachment located on or near the attachment edge, the display panel mounting attachment configured to attach the display panel to the bag and pivot from a storage position to an operating position;
      iii) a front side display panel portion having an outward facing surface comprised of a display and an opposite inward facing surface;
      iv) a back side display panel portion having an outward facing surface comprised of a control and an opposite inward facing surface; and
      v) a means for attaching the back side display panel portion to the front side display panel portion with their inward facing surfaces adjacent to each other.

2. The display device of claim 1, wherein the display panel mounting attachment is attached to at least one of the front side display panel portion and back side display panel portion.

3. The display device of claim 1, wherein the means for attaching the back side display panel portion to the front side display panel portion is a fastening frame.

4. The display device of claim 3, wherein the fastening frame is further comprised of a guide configured to guide an operator's fingers to the control on the back side display panel portion.

5. The display device of claim 1, wherein one of the front side display panel portion and back side display panel portion is further comprised of an electrical connection configured to lead to an interior of the bag.

6. The display device of claim 1, further comprising an electrical connection from the front side display panel portion to the back side display panel portion.

7. A computer display device for mounting on a bag, the device comprised of:
   a) a front side display panel portion having an outward facing surface comprised of a display and an opposite inward facing surface;
   b) a back side display panel portion having an outward facing surface comprised of a control and an opposite inward facing surface; and
   c) an attachment frame comprised of an attachment edge and configured to hold the front side display panel portion and back side display panel portion together, the attachment frame including a display panel mounting attachment on or near the attachment edge and configured to attach the attachment frame to the bag and pivot from a storage position to an operating position.

8. The display device of claim 7, wherein the attachment frame is further comprised of a guide configured to guide an operator's fingers to the control on the back side display panel portion.

9. The display device of claim 7, wherein the attachment frame is further comprised of an electrical connection configured to lead to an interior of the bag.

10. The display device of claim 7, wherein one of the front side display panel portion and back side display panel portion is further comprised of an electrical connection configured to lead to an interior of the bag.

11. The display device of claim 7, further comprising an electrical connection from one of the front side display panel portion and back side display panel portion to the attachment frame.

12. The display device of claim 7, wherein the front side display panel portion and back side display panel portion are attached to each other with their inward facing surfaces adjacent to each other.

13. A computer display device for mounting on a bag, the device comprised of:
   a) a front side display panel portion having an outward facing surface comprised of a display and an opposite inward facing surface; and b) an attachment frame comprised of an attachment edge and configured to hold the front side display panel portion, the attachment frame including a display panel mounting attachment on or near the attachment edge and configured to attach the attachment frame to the bag and pivot from a storage position to an operating position.

14. The display device of claim 13, further comprising a back side display panel portion having an outward facing surface including a control, wherein the attachment frame is further configured to hold the back side display panel portion and the front side display panel portion together.

15. The display device of claim 14, wherein the attachment frame is further comprised of a guide configured to guide an operator's fingers to the control on the back side display panel portion.

16. The display device of claim 13, wherein the attachment frame is further comprised of an electrical connection configured to lead to an interior of the bag.

17. The display device of claim 13, wherein the front side display panel portion is further comprised of an electrical connection configured to lead to an interior of the bag.

18. The display device of claim 13, further comprising an electrical connection from the front side display panel portion to the attachment frame.

19. A portable computer display device comprising:
a) a bag comprised of a front wall including an exterior, and
b) a display panel comprising an attachment edge, a back side and a front side including a display, wherein the display panel is attached to the bag at or near the attachment edge and the display panel pivots from an operating position to a storage position on the exterior of the front wall.

20. The display device of claim 19, wherein display panel is removably attached to the bag.

21. The display device of claim 20, wherein the display panel is further comprised of a display panel mounting attachment on or near the attachment edge and configured to removably attach the display panel to the bag.

22. The display device of claim 21, wherein the display panel mounting attachment is comprised of two jaws.

23. The display device of claim 20, wherein the bag is further comprised of a bag mounting attachment configured to removably attach the display panel to the bag.

24. The display device of claim 19, wherein the display panel is further comprised of a control on the back side.

25. The display device of claim 24, wherein the display panel back side is further comprised of a guide configured to guide an operator's fingers to the control.

26. The display device of claim 19, wherein the display panel is further comprised of an electrical connection configured to lead to an interior of the bag.

27. The display device of claim 19, wherein the display panel is further comprised of an attachment frame configured to hold a front side display panel portion comprised of an outward facing surface including the display.

28. The display device of claim 27, further comprising a back side display panel portion having an outward facing surface including a control, wherein the attachment frame is further configured to hold the back side display panel portion and the front side display panel portion together.

29. The display device of claim 28, wherein the attachment frame is further comprised of a guide configured to guide an operator's fingers to the control on the back side display panel portion.

30. The display device of claim 28, wherein the back side display panel portion is further comprised of an electrical connection configured to lead to one of the attachment frame and an interior of the bag.

31. The display device of claim 27, wherein the front side display panel portion is further comprised of an electrical connection configured to lead to one of the attachment frame and an interior of the bag.

32. The display device of claim 27, wherein the attachment frame is further comprised of an electrical connection configured to lead to an interior of the bag.

33. The display device of claim 19, wherein the bag is further comprised of a cover attached to the bag and pivotable to cover or expose the display panel.

* * * * *